United States Patent Office 3,153,060
Patented Oct. 13, 1964

3,153,060
ENOL ETHERS OF 6-METHYL-3-OXO-4,6-DIENIC STEROIDS
George Cooley, Bernard Ellis, and Vladimir Petrow, London, England, assignors to The British Drug Houses Limited
No Drawing. Filed Oct. 2, 1962, Ser. No. 227,706
Claims priority, application Great Britain, Oct. 10, 1961, 36,325/61
9 Claims. (Cl. 260—397.2)

This invention is for improvements in or relating to organic compounds and has particular reference to a new class of enol ethers of 6-methyl 3-oxo-4,6-dienic steroids.

It is an object of the present invention to provide a new class of enol ethers having the general Formula I below which compounds are of value on account of their biological properties and as intermediates for the preparation of compounds having valuable biological properties.

The invention also provides the following specific new enol ethers:

17α-acetoxy-3-ethoxy-6-methylpregna-3,5,7-trien-20-one
17α - acetoxy - 3 - cyclohexyloxy-6-methylpregna-3,5,7-trien-20-one
17α - acetoxy - 3 - methoxy-6-methylpregna-3,5,7-trien-20-one which compounds are potent progestational agents when administered by the oral route, 17β - acetoxy - 3 - methoxy-6-methylandrosta-3,5,7-triene which has claudogenic activity
3-methoxy-6-methylcholesta-3,5,7-triene which is of value as an intermediate for the preparation of 6-methylated derivatives which may be prepared from it, for example, by hydrogenation followed by demethylation if so desired
3-ethoxy-6-methylandrosta-3,5,7-triene-17-one which is of value as an intermediate
17α - acetoxy - 3 - ethoxy - 6-methyl-16-methylenepregna-3,5,7-trien-20-one and
17α - acetoxy - 6,16α - dimethyl - 3 - ethoxypregna-3,5,7-trien-20-one which have claudogenic activity The invention also provides a process for the preparation of the enol ethers (I) utilising as the starting materials the corresponding 6-methyl-3-oxo-4,6-dienic steroids having the general Formula II below.

According to the present invention there is provided a process for the preparation of enol ethers of the general Formula I

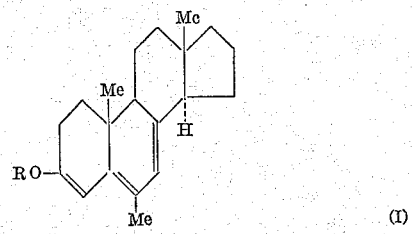

(I)

where R is an alkyl or alicyclic radical containing not more than 7 carbon atoms, which process comprises reacting a 6-methyl 3-oxo-4,6-dienic steroid having the general Formula II

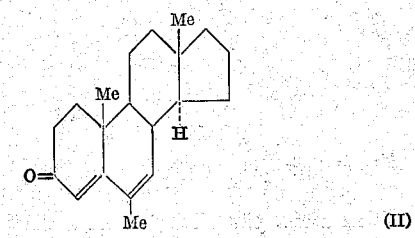

(II)

with an aliphatic or alicyclic alcohol (containing up to 7 carbon atoms) or with an orthoformic ester thereof in the presence of a catalytic quantity of $H^+$ ions.

The most convenient method comprises reacting the 6-methyl 3-oxo-4,6-dienic steroid (II) with a trialkyl orthoformate $HC(O.R)_3$, where R is a lower alkyl group containing up to 7 carbon atoms in the presence of a catalytic quantity of the corresponding alcohol (R.OH, where R has the same meaning as above) and an acid catalyst, in an inert solvent, when it is converted in high yield into the enol ether (I).

In a second method the desired enol ether may be formed by reacting a 6-methyl 3-oxo-4,6-dienic steroid (II) with methyl or ethyl orthoformate and thereafter reacting the resulting pre-formed enol methyl or ethyl ether with the desired alcohol (for example cyclohexanol).

In carrying the process into effect, the starting material (II) may be dissolved in an anhydrous inert solvent which may be, for example, tetrahydrofuran, dioxan, benzene or toluene. The trialkyl-orthoformate, the corresponding alcohol, and the acid catalyst may be added in any order. The trialkyl orthoformate is present preferably in somewhat greater than one molar proportion, but a large excess is not harmful. The quantity of the corresponding alcohol is not critical and may be conveniently from 1% to 20% of the volume of the trialkyl orthoformate employed. The acid catalyst may be a strong acid such as sulphuric, toluene-p-sulphonic, perchloric or hydrochloric acid. The reaction will proceed at any temperature between 0° and 100° C., but is most conveniently performed at temperatures between 50° and 100° C., when it is generally complete in from 1 hour to 24 hours.

The product may be isolated in any convenient manner. Thus when dioxan is employed as the solvent, the acid catalyst may be neutralised by the addition of excess of a base such as pyridine or triethylamine, and the solution diluted with water until the product separates out. If a solvent is used which is not miscible with water, a base such as pyridine may be added, and the solution may then be washed with water, dried over anhydrous sodium sulphate, and the solvent removed. The products may be purified by crystallisation from suitable solvents such as methanol or acetone/hexane preferably with the addition of a drop of pyridine to ensure the stability of the enol ether system.

The process of the invention may be applied to 6-methyl 3-oxo-4,6-dienic derivatives of cholestane, androstane, pregnane and spirostane which may contain additional unsaturated linkages at positions such as 9-11, 11-12, 15-16, 16-17, 17-20 and 20-21.

The following additional groups will not, in general, interfere with the process of the invention:

Hydroxy or acyloxy groups at positions such as C-11, 16, 17, 20 and 21;
Oxo groups at positions such as C-11, 17 and 20;
Alkyl groups containing up to 4 carbon atoms, and in particular methyl groups, at positions such as C-1, 2, 11, 16, 17 and 21;
Ethynyl groups and substituted ethynyl groups containing up to 4 carbon atoms at position C-17;
Methylene groups at positions such as C-11, 16 and 16–17;
Halo groups, and in particular fluoro- and chloro-groups at positions such as C-9, 11, 16, 17 and 21;
Isopropylidenedioxy at position 16–17 in 20-oxo pregnanes, and
Bis-methylenedioxy at position 17α,20:20,21.

Following is a description by way of example of methods of carrying the invention into effect.

EXAMPLE 1

17α-Acetoxy-3-Ethoxy-6-Methylpregna-3,5,7-Trien-20-One

17α - acetoxy - 6 - methylpregna - 4,6 - diene - 3,20-dione (Ellis, Kirk, Petrow, Waterhouse and Williamson, J. Chem. Soc., 1960, 2828) (1.5 g.) in dry benzene (25 ml.) was treated with triethylorthoformate (1 ml.), ethanol (1 ml.) and toluene-p-sulphonic acid (10 mg.), and the mixture heated under reflux for 3 hours. After cooling, pyridine (1 ml.) was added, the mixture washed twice with water, dried and the solvents evaporated in vacuo. The product was purified from ethanol containing a trace of pyridine to give 17α-acetoxy-3-ethoxy-6-methylpregna-3,5,7-trien-20-one as yellow needles, M.P. 195 to 200° C., $[\alpha]_D^{27}$ —127° (c., 0.887 in chloroform containing 0.2% pyridine), $\lambda_{max.}$ 322.5 mu ($\epsilon$ 19,060), $\gamma_{max.}^{CCl_4}$ 1738, 1719, 1648 and 1616 cm.$^{-1}$

EXAMPLE 2

17β - acetoxy - 6 - methylandrosta - 4,6 - dien - 3 - one (Ellis, Kirk, Petrow, Waterhouse and Williamson, J. Chem. Soc., 1960, 2828) (0.7 g.) in redistilled benzene (10 ml.) was treated with methyl orthoformate (0.4 ml.), methanol (0.4 ml.) and toluene-p-sulphonic acid (5 mg.). The mixture was heated under reflux for 3 hours, cooled, and pyridine (0.5 ml.) added. After being washed with water, the mixture was dried over sodium sulphate, the solvents removed in vacuo, and the product triturated with methanol. Crystallisation from methanol containing a trace of pyridine gave 17β-acetoxy-3-methoxy-6-methylandrosta-3,5,7-triene in prisms, M.P. 137 to 145° C., $[\alpha]_D^{26}$ —60° (c., 1.05 in chloroform), $\lambda_{max.}$ 320.5 mu ($\epsilon$ 12,000), $\gamma_{max.}^{CCl_4}$ 1737, 1661 and 1647 cm.$^{-1}$

EXAMPLE 3

A solution of 6-methyl-25D-spirosta-4,6-dien-3-one (Ellis, Kirk, Petrow, Waterhouse and Williamson, J. Chem. Soc., 1960, 2828) (1.5 g.) and toluene-p-sulphonic acid (100 mg.) in dry benzene (30 ml.), methanol (1 ml.) and methyl orthoformate (1 ml.) was heated under reflux for 3 hours. After cooling, pyridine (1 ml.) was added, the mixture washed with water, dried, and the solvents removed by distillation under reduced pressure. 3 - methoxy - 6 - methyl - 25D - spirosta - 3,5,7 - triene was obtained with $\gamma_{max.}^{Nujol}$ 1625 and 1660 cm.$^{-1}$

EXAMPLE 4

A solution of 6-methylcholesta-4,6-dien-3-one (Ellis, Kirk, Petrow, Waterhouse and Williamson, J. Chem. Soc., 1960, 2828) (1.5 g.) and toluene-p-sulphonic acid (50 mg.) in dry benzene (25 ml.), methanol (1 ml.) and methyl orthoformate (1 ml.) was heated under reflux for 3 hours. The product was isolated as described in the foregoing examples to give 3-methoxy-6-methylcholesta-3,5,7-triene with $\gamma_{max.}^{Nujol}$ 1630 and 1660 cm.$^{-1}$

EXAMPLE 5

17α-Acetoxy-3-Methoxy-6-Methylpregna-3,5,7 Trien-20-One

17α - acetoxy - 6 - methylpregna - 4,6 - dien - 3,20-dione (3.0 g.) in dry benzene (50 ml.) was treated with trimethyl orthoformate (2 ml.), methanol (2 ml.) and toluene-p-sulphonic acid (100 mg.), and the mixture heated under reflux for 3 hours. After cooling, pyridine (2 ml.) was added, the mixture washed twice with water (50 ml.), dried and the solvents evaporated in vacuo. The product was purified from methanol containing a trace of pyridine to give 17α-acetoxy-3-methoxy-6-methyl-pregna-3,5,7-trien-20-one as golden plates M.P. 209 to 215° C., $[\alpha]_D^{26}$ —130° (c., 0.95 in CHCl$_3$ containing 2% of pyridine), $\lambda_{max.}$ 322 mu ($\epsilon$ 19,450).

EXAMPLE 6

17α-Acetoxy-3-Cyclohexyloxy-6-Methylpregna-3,5,7-Trien-20-One

A solution of 17α-acetoxy-3-methoxy-6-methylpregna-3,5,7-trien-20-one (1.34 g.) (prepared as in Example 5) in dry benzene (150 ml.) and cyclohexanol (3 ml.) was distilled until 60 ml. of distillate had been collected. Toluene-p-sulphonic acid (6 mg.) was then added and distillation continued over a period of 3 hours when most of the solvents had been removed. Pyridine (3 drops) was then added and residual solvents removed under high vacuum. The dark brown residue was purified from methanol to give 17α-acetoxy-3-cyclohexyloxy-6-methylpregna-3,5,7-trien-20-one as pale yellow needles, M.P. 200 to 207° C., $[\alpha]_D^{20}$ —102° (c., 0.86 in CHCl$_3$ containing 2% of pyridine), $\lambda_{max.}$ 324 mu ($\epsilon$ 20,440).

EXAMPLE 7

6-methylandrosta-4,6-diene-3,17-dione (Ellis, Kirk, Petrow, Waterhouse and Williamson, J. Chem. Soc., 1960, 2828) (6 g.) in sodium-dried benzene (100 ml.) was treated with triethylorthoformate (4 ml.), ethanol (4 ml.) and toluene-p-sulphonic acid (200 mg.). The mixture was heated under reflux for 1½ hours, cooled and pyridine (4 ml.) added. After being washed with water, the mixture was dried over sodium sulphate, the solvents removed in vacuo, and the product triturated with ethanol. Crystallisation from ethanol containing a trace of pyridine gave 3-ethoxy-6-methylandrosta - 3,5,7 - trien - 17-one in prisms, M.P. 125 to 131° C., $[\alpha]_D^{23}$—74° (c., 1.02 in chloroform containing 0.2% pyridine), $\lambda_{max.}$ 323 mu ($\epsilon$ 18,600), $\gamma_{max.}^{CCl_4}$ 1743, 1649 and 1618 cm.$^{-1}$

EXAMPLE 8

17α - acetoxy - 6 - methyl - 16 - methylenepregna - 4,6-diene-3,20-dione (British Patent No. 886,619) (10 g.) in dry benzene (165 ml.) was treated with triethylorthoformate (6.5 ml.), ethanol (6.5 ml.) and toluene-p-sulphonic acid (330 mg.). The mixture was heated under reflux for 2 hours, cooled, and pyridine (6.5 ml.) added. After being washed with water, the mixture was dried, the solvents removed in vacuo, and the residue purified from ethanol containing a trace of pyridine. 17α-acetoxy-3 - ethoxy - 6 - methyl - 16 - methylenepregna - 3,5,7-trien-20-one separated in prisms, M.P. 194 to 198° C., $[\alpha]_D^{21}$—188° (c., 1.0 in chloroform containing 0.2% pyridine), $\lambda_{max.}$ 324 mu ($\epsilon$ 18,810), $\gamma_{max.}^{CCl_4}$ 1746, 1720, 1710, 1649 and 1615 cm.$^{-1}$

EXAMPLE 9

17α - acetoxy - 6,16α - dimethylpregna - 4,6-diene-3,20-dione (Ellis, Hall, Petrow and Williamson, J. Chem. Soc., 1962, 22) (6 g.) in dry benzene (100 ml.) was treated with triethylorthoformate (4 ml.), ethanol (4 ml.) and toluene-p-sulphonic acid (200 mg.). The mixture was heated under reflux for 2 hours, cooled, and pyridine (4 ml.) added. After being washed with water, the mixture was dried, the solvents removed in vacuo, and the residue crystallised from ethanol containing a trace of pyridine. 17α - acetoxy - 6,16α - dimethyl - 3 - ethoxypregna-3,5,7-trien-20-one separated in plates, M.P. 202 to 207° C., $[\alpha]_D^{22}$—84° (c., 1.0 in chloroform containing 0.2% pyridine), $\lambda_{max.}$ 323 mu ($\epsilon$ 19,670), $\gamma_{max.}^{CCl_4}$ 1744, 1716, 1657 and 1618 cm.$^{-1}$

We claim:
1. A 6-methyl-3,5,7-trienic steroid having at the 17 position a side chain selected from the group consisting of those characterising cholestane, androstane, pregnane and spirostane compounds and having an —OR group attached to the number 3 carbon atom, wherein R is a radical selected from the group consisting of alkyl and alicyclic containing not more than 7 carbon atoms.

2. 17α - acetoxy - 3 - ethoxy - 6 - methylpregna - 3,5,7-trien-20-one.

3. 17α - acetoxy - 3 - cyclohexyloxy - 6 - methylpregna-3,5,7-trien-20-one.

4. 17α - acetoxy - 3 - methoxy - 6 - methylpregna-3,5,7-trien-20-one.

5. 17β - acetoxy - 3 - methoxy-6-methylandrosta - 3,5,7-triene.

6. 3-methoxy-6-methylcholesta-3,5,7-triene.

7. 3-ethoxy-6-methylandrosta-3,5,7-trien-17-one.

8. 17α - acetoxy - 3 - ethoxy - 6 - methyl - 16 - methylenepregna-3,5,7-trien-20-one.

9. 17α - acetoxy - 6,16α - dimethyl - 3 - ethoxypregna-3,5,7-trien-20-one.

References Cited in the file of this patent

UNITED STATES PATENTS 2,926,163    Dauben et al. _____ Feb. 23, 1960

OTHER REFERENCES

Fieser et al.: Natural Products Related to Phenanthrene, 3rd Ed., 1949, pp. 371–372, Reinhold Publishing Corp., 430 Park Avenue, New York 22, N.Y.